UNITED STATES PATENT OFFICE.

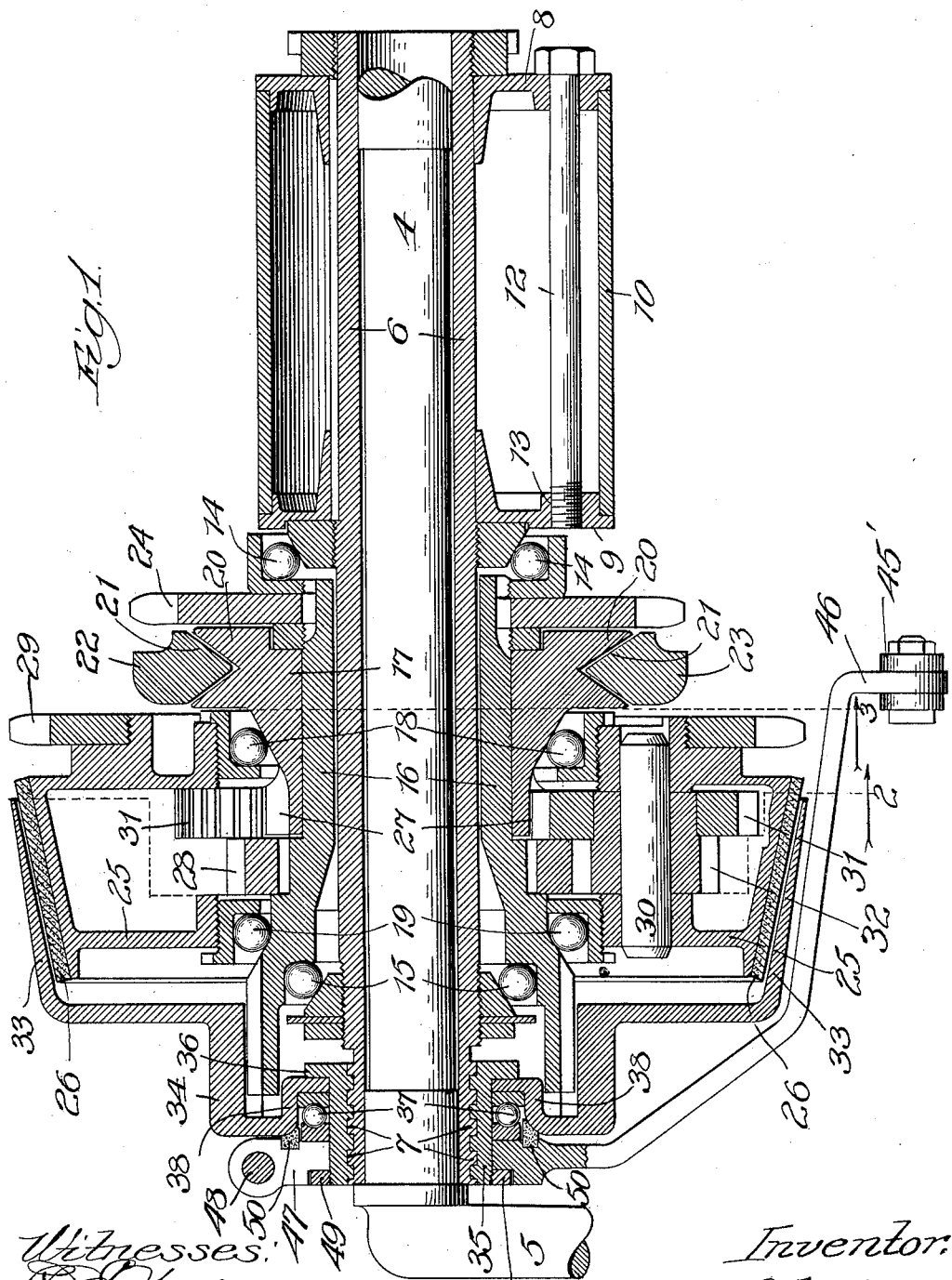

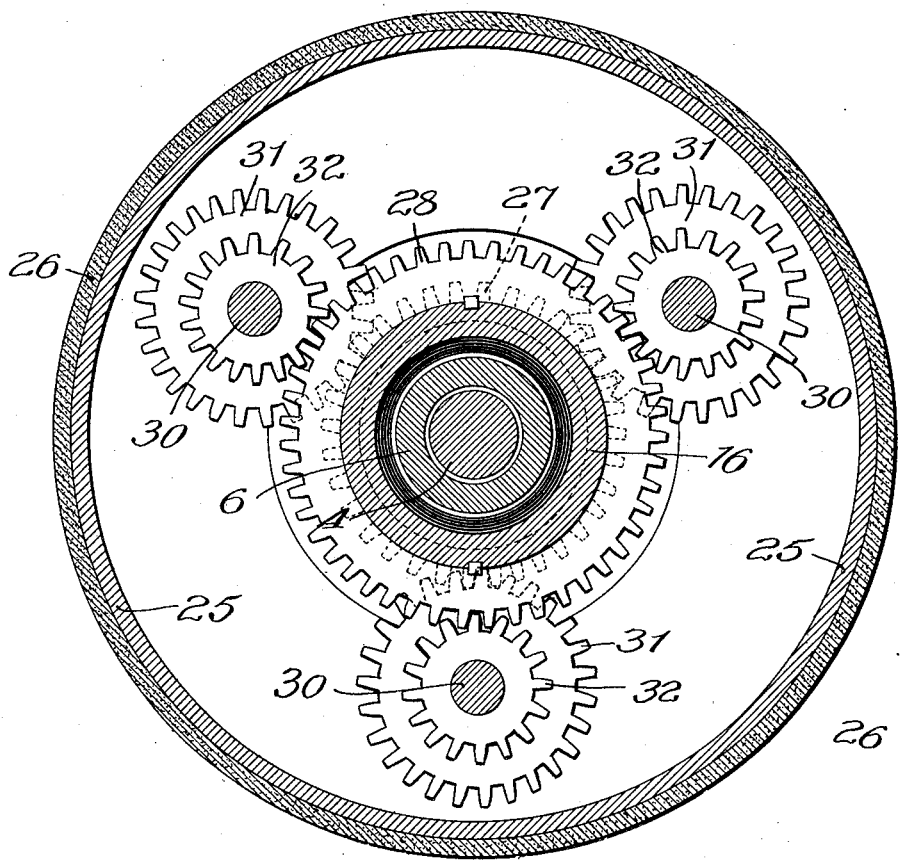

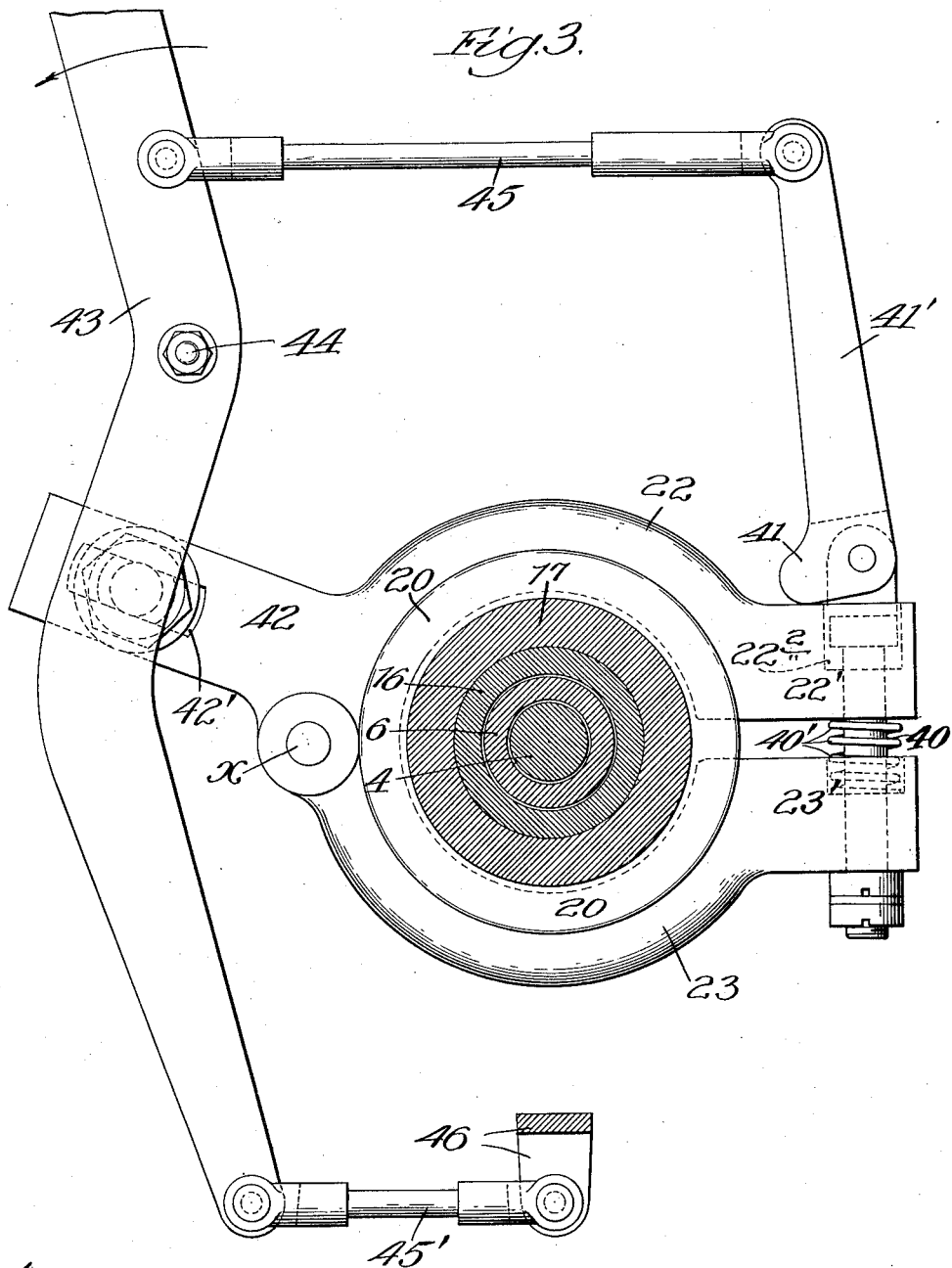

IGNAZ SCHWINN, OF CHICAGO, ILLINOIS.

VARIABLE-SPEED GEARING.

1,100,261. Specification of Letters Patent. Patented June 16, 1914.

Application filed December 23, 1913. Serial No. 808,408.

*To all whom it may concern:*

Be it known that I, IGNAZ SCHWINN, a citizen of the United States, residing at Chicago, in the county of Cook and State of Illinois, have invented a new and useful Improvement in Variable-Speed Gearing, of which the following is a specification.

My invention relates to an improvement in the class of variable-speed gearing, of the planetary type, which I have devised more especially for motorcycles for driving them, at will, at low speed or at high speed.

In the accompanying drawings, Figure 1 shows my improved variable-speed gearing by a broken view in longitudinal section and partly in elevation, with the parts in their intermediate or non-functional relative positions; Fig. 2 is a section on the irregular line 2, Fig. 1, and Fig. 3 is a section on line 3, Fig. 1, but on a somewhat smaller scale than the last-named figure.

At 4 is represented the pedal crank-shaft, the crank on one end of which is shown at 5, though, as will be understood, the opposite end is similarly equipped with a crank. A tubular sheath 6, loose about the shaft, is provided on one end with a coarse thread 7 and carries eccentrically on its opposite end, as is more or less usual, the heads 8 and 9 of a hanger-bracket barrel 10, which is fastened between the heads by bolts, one of which (though more are ordinarily employed) is represented at 12 in Fig. 1, these bolts passing through the outer head and screwing at their inner ends into sockets, like the one shown at 13. The heads are keyed to the sheath 6. The purpose of this eccentric support of the hanger-bracket is to adapt it, by turning, to take up slack in the chain (not shown) which connects one of the sprockets, hereinafter described, with the shaft of the motor. A ball-bearing is provided, at 14, near one end of the variable-speed gearing, and another and similar ball-bearing is provided at 15, near the opposite end of the gearing. These bearings have the cups for the balls formed within the expanded, or skirt-like end-portions of an elongated sleeve 16 surrounding the sheath. These two ball-bearings are thus provided relatively far apart with the advantage of stably carrying the mechanism by supporting it near its ends. The sleeve is surrounded by a collar 17 forming the race for one of two intermediate ball-bearings 18, the other intermediate ball-bearing 19 having its ball-race about the outer surface of the sleeve. In the expanded, disk-like head 20 of the collar is formed a circumferential V-shaped groove 21 for a metal clutch-band formed of pivotal sections 22 and 23 (Fig. 3); and between this head and the cup of the ball-bearing 14 is a sprocket 24 engaging the sleeve 16 to rotate with it. This sprocket is for connection by a chain (not shown) with the rear axle of a motorcycle. A hollow body forming an annular housing 25, having opposite walls and a sloping periphery to render it of general cone-frustum shape, is secured in position by screwing it on the cups of the bearings 18 and 19, and has a band 26 of friction-material, such as leather, about its periphery. A gear-wheel 27 of relatively-small diameter is provided about the collar 17, being preferably formed integral therewith, and a relatively-larger gear-wheel 28 is secured about the sleeve 16. A sprocket 29, for connection by a chain (not shown) with a motor-shaft, is screwed upon a bearing projecting from the inner wall of the housing 25. Pins 30, of which three are shown in Fig. 2, are rigidly supported at their ends and at uniform distances apart in the opposite walls of the housing, and each carries a relatively-large pinion 31 meshing with the gear 27 and a relatively-small pinion 32 meshing with the gear 28. A flaring clutch-hood 33 surrounds the housing 25 to be engaged frictionally with the band 26, and is keyed in its neck-portion 34 to the sleeve 16. A nut 35 working on the thread 7 is provided with a flange 36 on its inner end, between which and a ball-bearing 37 surrounding the nut is confined an offset section 38 of the outer end of the neck 34, whereby turning the nut on the thread 7 shifts the hood to clutch or unclutch it by bringing it into or out of frictional engagement with the band 26.

The sections 22 and 23 of the divided clutch-band, which is best shown in Fig. 3, are pivotally connected at $x$, and are provided with lip-extensions 22′ and 23′ connected by a bolt 40 passing through them with its head, in a socket $22^2$ in the lip 22′, extended to form a bearing for pivoting to it a presser-foot 41, whereby turning the latter in one direction forces the lips toward each other to tighten the clutch-band sections about the head 20, and turning it in the opposite direction releases the sections to permit them to separate by the expansion of a spring 40' and free the head. A stem 42 extends from the section 22 to afford means for adjustably fastening against turning the clutch-band through a longitudinal slot 42' to the frame of a motorcycle on which my improved variable-speed gearing is designed to be used. This clutch is operated by a lever 43 fulcrumed between its ends at 44. The stem 41' of the presser-foot 41 has a link-connection 45 with the operating lever at one side of its fulcrum, and the end of the lever at the opposite side of its fulcrum has a link-connection 45' with one end of a bent arm 46 terminating at its opposite end in a split collar 47 tightened by a bolt 48 working in the lips on its ends to secure it tightly about the nut 35.

As shown in Fig. 1, the parts surrounding the nut are confined by a threaded washer 49; and a dust-band 50 is provided between the collar 47 and inner rounded corner of the end of the housing neck 34.

The operation is as follows: By throwing the lever 43 in one direction, as by pressing it in the direction indicated by an arrow on Fig. 3, the arm 46 is turned and with it the collar 47 to turn and retract the nut 35 for moving the hood 33 toward the left (Fig. 1) and thus unclutch it from the housing. This same movement of the lever bears the presser-foot 41 against the lip 22' to tighten or clutch the band-sections 22, 23 about the head 20. Then, with the motor in action, it drives the sprocket 29 to rotate the housing 25 and with it the pinions 32 to turn the gear 28 on the sleeve, thereby rotating the latter and with it the sprocket 24 thereon to rotate the rear axle of and drive the motorcycle at low speed. By the operation thus described the collar 17, being locked against rotation by the band 22 in the groove about its head 20, prevents rotation of the gear 27, so that the pinions 31 revolve, with the housing, idly about it while the pinions 32 are driving the gear 28. Throwing the operating lever in the opposite direction withdraws the presser-foot from the band-lip 22' to release the clutch-band from the head 20 and thus free the collar 17; and this throw of the lever at the same time turns the arm 46 to actuate the nut 35 to advance the hood 33 into clutch with the friction-band 26, whereby rotation of the sprocket 29 by the motor rotates the housing which rotates with it the hood; and since the hood is keyed to the sleeve 16 carrying the sprocket 24, the latter is also revolved, and drives the rear axle at high speed. In this operation the pinions and gears revolve together and not upon each other and, of course, are therefore functionless. Between the described two extreme throws of the operating lever there is an intermediate normal position therefor, wherein it sets the hood in unclutched relation to the housing while holding the presser-foot in its band-releasing position to free the collar 17, whereby the motor may continue in action and rotate the sprocket 29, but without turning the rear-wheel driving-sprocket 24.

The ratio of the sprocket 29 may be understood to be as 2 to 1 to the sprocket on the motor-shaft; and that of the sprocket on the rear axle of the motorcycle may be understood to be as 2 to 1 to that of the sprocket 24. This renders the reduction from the motor-shaft to the rear wheel as 4 to 1, and the gears are so proportioned as to produce a 4 to 1 reduction; so that when driving from the engine to sprocket 29 through the gears, which have a 4 to 1 reduction, that reduction is added to the sprocket-reduction of 4 to 1, giving a total reduction of 8 to 1, which is the low speed, thereby to increase the power in running over bad roads and climbing. That ratio may, however, be varied without departure from my invention.

I realize that considerable variation is possible in the details of construction thus specifically shown and described, and I do not intend by illustrating a single, specific or preferred embodiment of my invention to be limited thereto; my invention being in the following claims to claim protection upon all the novelty there may be in my invention as broadly as the state of the art will permit.

What I claim as new and desire to secure by Letters Patent is—

1. A variable-speed gearing comprising, in combination with a pedal-shaft, a sheath about said shaft, a sleeve rotatably surrounding the sheath and a relatively large gear and a sprocket carried thereby, a headed collar loosely surrounding the sleeve and carrying a relatively small gear, a clutch-band about the collar-head, a housing mounted to rotate about the sleeve and collar and a sprocket carried thereby, relatively large and small rigidly connected pinions journaled in the housing to mesh, respectively, with said smaller and larger gears, a rotatably mounted hood splined to said sleeve to be shifted into and out of frictional engagement with the housing periphery, an operating lever, and means operated by throwing said lever to simultaneously disengage the hood from or engage it with the housing and tighten or loosen said band about the collar-head.

2. A variable-speed gearing comprising, in combination with a pedal-shaft, a sheath about said shaft, a sleeve rotatably surrounding the sheath and a relatively large gear and a sprocket carried thereby, a headed collar loosely surrounding the sleeve and carrying a relatively small gear, a clutch-band about the collar-head, a housing mounted to rotate about the sleeve and collar and having end-walls and a beveled periphery provided with friction-material, a sprocket secured on the inner housing-wall, relatively large and small rigidly connected pinions journaled in the housing to mesh, respectively, with said smaller and larger gears, a hood rotatably mounted and splined to said sleeve to be shifted into and out of frictional engagement with the housing-periphery, an operating lever, and means operated by throwing said lever to simultaneously disengage the hood from or engage it with the housing and tighten or loosen said band about the collar-head.

3. A variable-speed gearing comprising, in combination with a pedal-shaft, a sheath about said shaft, an elongated sleeve supported on ball-bearings near its opposite ends to be rotated about the sheath and a relatively large gear carried thereby, a headed collar loosely surrounding the sleeve and carrying a relatively small gear, a clutch-band about the collar-head, a housing rotatably mounted on the sleeve and collar and a sprocket carried thereby, relatively large and small rigidly connected pinions journaled in the housing to mesh, respectively, with said smaller and larger gears, a hood rotatably mounted and splined to said sleeve to be shifted into and out of frictional engagement with the housing periphery, an operating lever, and means operated by throwing said lever to simultaneously disengage the hood from or engage it with the housing and tighten or loosen said band about the collar-head.

4. A variable-speed gearing comprising, in combination with a pedal-shaft, a sheath about said shaft provided at one end with a thread and a nut on the thread, a sleeve rotatably surrounding the sheath and a relatively large gear and a sprocket carried thereby, a headed collar loosely surrounding the sleeve and carrying a relatively small gear, a clutch-band about the collar-head, a housing mounted to rotate about the sleeve and collar and a sprocket carried thereby, relatively large and small rigidly connected pinions journaled in the housing to mesh, respectively, with said smaller and larger gears, a hood having a neck at which it has a thrust-bearing on the nut and splined to said sleeve and adapted to be shifted into and out of frictional engagement with the housing-periphery, a shoe pivoted to engage an end of said band, an arm connected with said nut for turning it, and an operating lever having link-connections at opposite sides of its fulcrum respectively with said shoe and said arm.

IGNAZ SCHWINN.

In presence of—
A. C. FISCHER,
F. A. FLORELL.

---

Copies of this patent may be obtained for five cents each, by addressing the "Commissioner of Patents, Washington, D. C."